No. 17,791.  
PATENTED JULY 14, 1857.

I. G. JOHNSON.  
USE OF COAL TAR FOR IRON FURNACES.

Inventor.  
J. G. Johnson

UNITED STATES PATENT OFFICE.

ISAAC G. JOHNSON, OF SPUYTEN DUYVEL, NEW YORK.

IMPROVEMENT IN THE USE OF COAL-TAR IN IRON-FURNACES.

Specification forming part of Letters Patent No. 17,791, dated July 14, 1857.

*To all whom it may concern:*

Be it known that I, ISAAC G. JOHNSON, of Spuyten Duyvel, in the county of Westchester and State of New York, have invented a certain new and useful Improvement in Heating Reverberatory Air-Furnaces for Melting Iron; and I do hereby describe and ascertain said improvement, referring to the accompanying drawings in illustration of the apparatus used therefor, in which—

Figure 1:
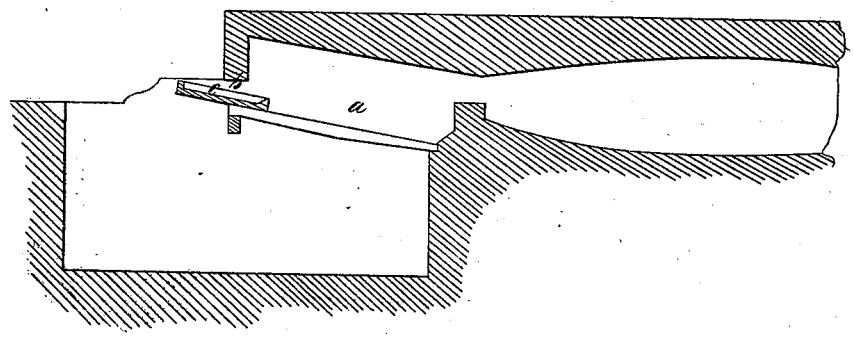
Figure 2:
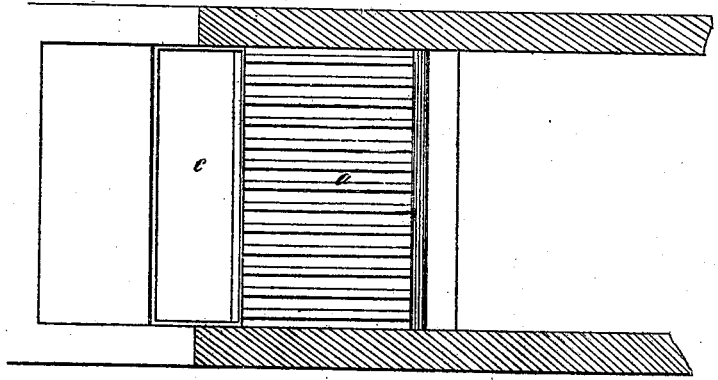

Figure 1 shows a vertical section; Fig. 2, a plan of the fire-chamber with top removed.

Many advantages are gained in the manufacture in which I employ my improvement—namely, in making malleable-iron castings by heat and in melting and refining the iron in an air-furnace instead of the usual plan of using a cupola; but heretofore the great expense of fuel, as compared with the latter mode, has been an objection in the air-furnace up to this time. There have been some attempts to use coal-tar as a fuel by mixing it with fine coal into cakes or blocks; but it is found by practical testing to be wholly impracticable for that purpose, as it runs down onto the grate-bars when heated and clogs them. Besides, the sulphurous matters sometimes found therein are detrimental to the iron, and, further, much unconsumed carbonaceous matter is driven over, also injurious to the iron, without a sufficient supply of oxygen therewith, and the introduction of a portion of atmospheric air into the ordinary furnace over the fire cooled it down too much and no economy of fuel was effected.

A device for using tar and steam in combustion for furnaces is found on page 215 of the London edition of "Hebert on the Steam-Engine," of 1856; but it will be obvious that this plan is wholly unsuited to an air-furnace for melting iron. The steam would be injurious to the iron, and a sufficient supply of coal-tar, if used, could not be kept up or a proper introduction of atmospheric air effected, and from this device it will be seen my apparatus essentially differs. Coal-tar has been introduced into a smelting-furnace through pipes simultaneously with an air-blast; but this differs from mine in two particulars—first, all the material or residuum of the coal-tar enters the furnace and mingles with the iron, and an artificial blast is there used, the furnace and all its accessories being entirely different from the one used by me, and besides which the introduction as then attempted has proved injurious, and is not, to my knowledge, now so employed. It is also a well-known device, frequently resorted to, to use two fire-chambers and pass the unconsumed gases of the one over the other for more perfect consumption. I refer to these various elementary devices to show the difference between mine and all such contrivances which approach nearest the simple and perfect mode I have discovered for using coal-tar as fuel in melting iron in an air-furnace.

I have, after considerable experiment, at last succeeded in using coal-tar as a fuel effectually, and by means of it I have reduced the cost of melting down to about the same point in the air-furnace as in the cupola has before been done, with all the advantages of refining, &c., so important in the manufacture of malleable iron. For the purpose of employing coal-tar as a fuel the furnace is made as in the drawings, the melting-hearth and appendages being omitted as being of usual form and construction.

*a* is the fire-chamber, into which coal is introduced upon the grate. Along in front of this fire-chamber there is a narrow opening, *b*, extending the length of the grate from one side of the furnace to the other and at a little elevation above the grate. An iron pan, made broad and shallow, is placed within this opening *b*. About two-thirds of the breadth of the pan *c* projects outside of the furnace in front, and one-third within the fire-chamber and above the grate, as is clearly seen in Fig. 1. The pan *c* is inclined, the outer edge being elevated a little, so that any liquid material upon it would tend to run into the fire-chamber. When the coal-fire is ignited upon the grate, a small quantity of coal-tar is put upon the pan *c* and ignited. The products of combustion from this are all drawn in through the narrow opening *b*, and pass directly over the burning coal, together with a proper portion of atmospheric air, to make a perfect combustion without reducing the heat, the coal itself being supplied with air from below. By introducing coal-tar in this way, with proper care a perfect combustion is kept up, and, as all the volatile matter is consumed, the residuum is pushed forward with additional coal into the fire-chamber onto the grate.

Care must be taken that no more tar shall be put upon the pan at a time than can be consumed without running over the lower inner edge thereof onto the grates, as otherwise the effect of clogging would be produced, as when it has been attempted to use it directly in the chamber with the fuel. By this means I obtain a most intense heat cheaply, much more so than has ever before been accomplished. The products of combustion pass over the bridge $d$ so consumed and commingled as not to be injurious to the iron. By this means, also, I have been enabled to melt and refine iron by the expenditure of one and one-half ton of coal for four tons of iron and five barrels of coal-tar, an effect never before realized.

Having thus fully described my improvement in melting iron, &c., what I claim therein as new is—

The employment of coal-tar in the air-furnace, substantially in the manner and for the purposes set forth.

In testimony whereof I have hereunto set my hand.

ISAAC G. JOHNSON.

Witnesses:
WM. H. STANSBURY,
EDWARD CLARKE.